Patented Sept. 12, 1922.

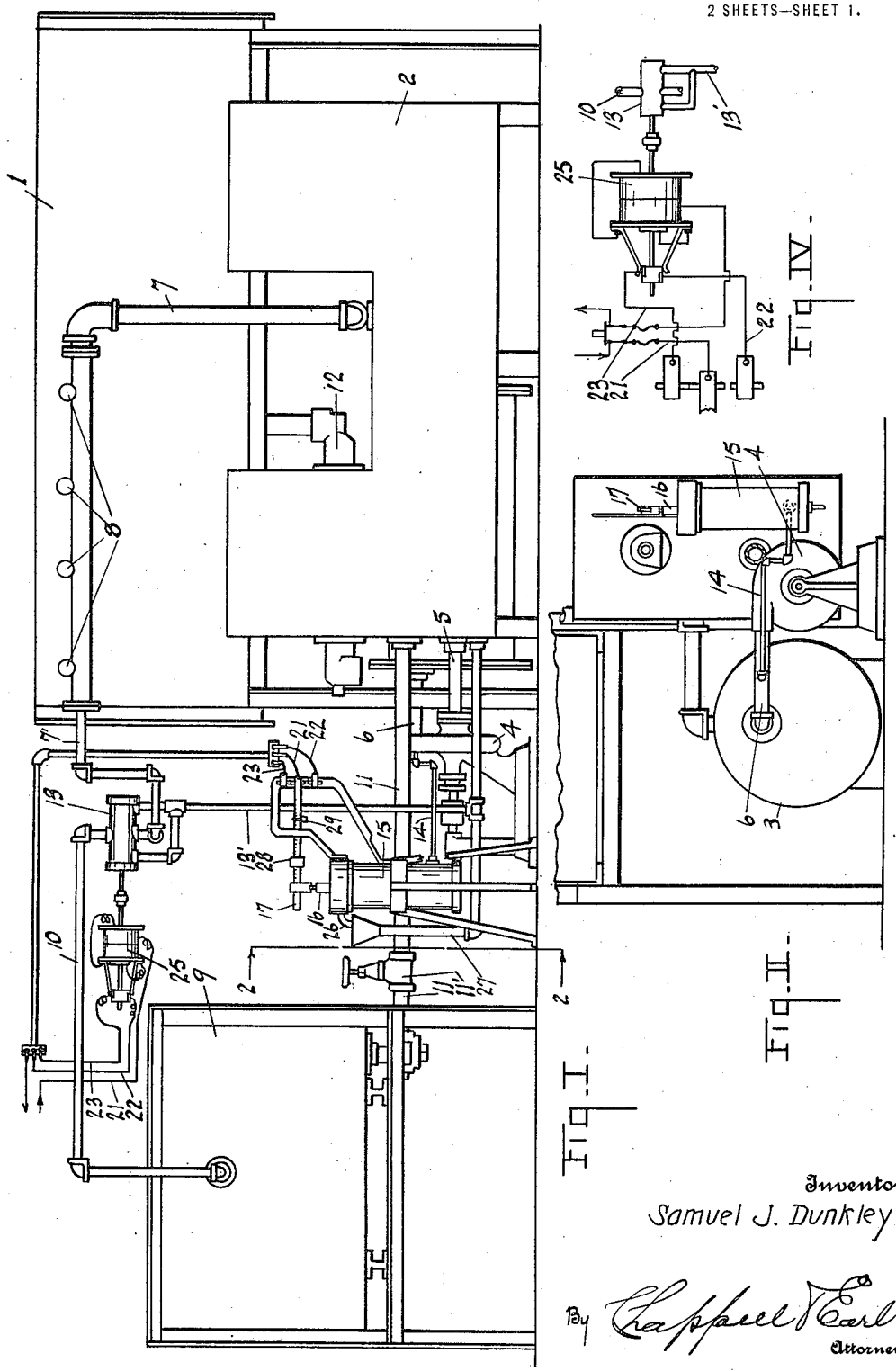

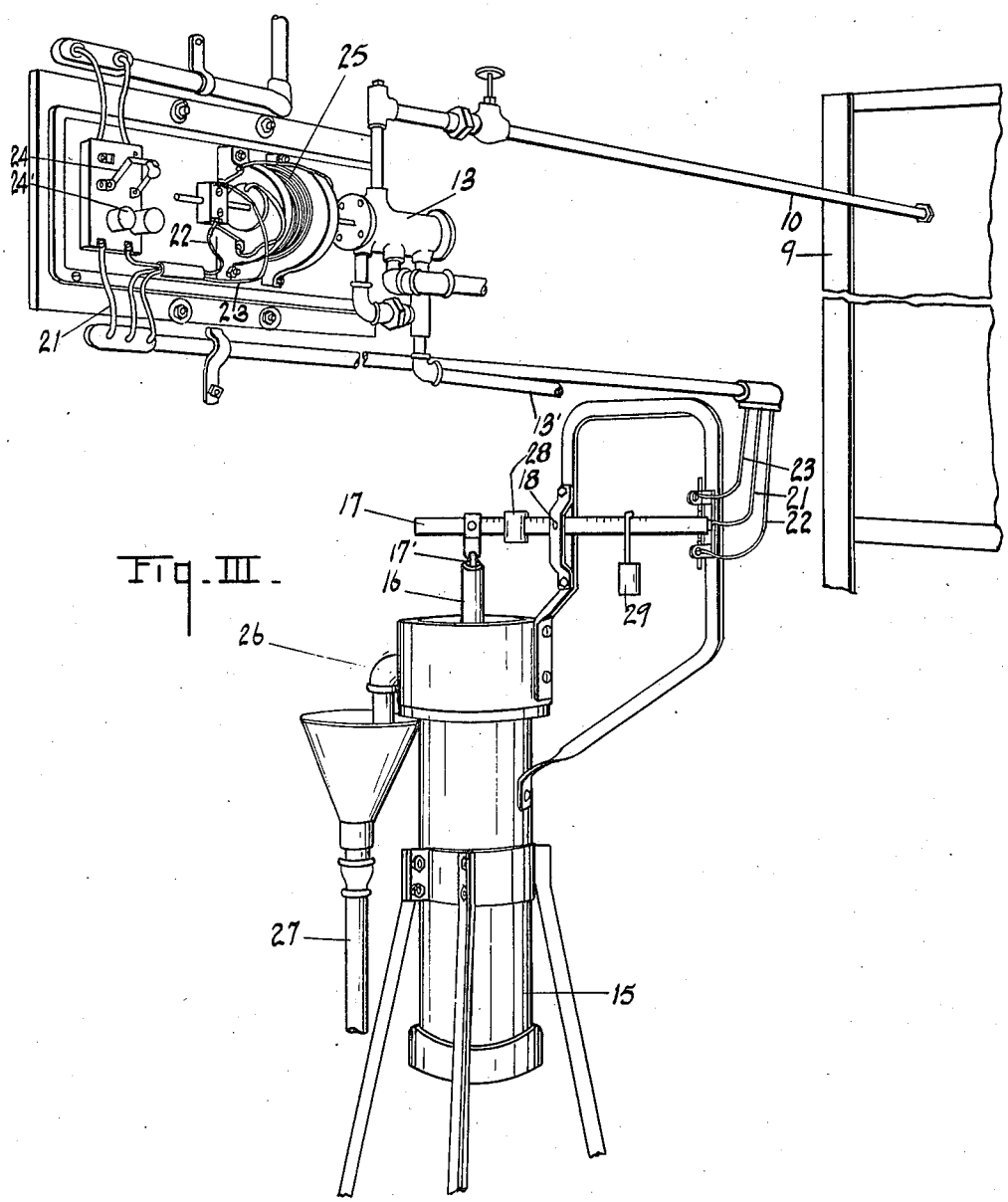

1,429,129

UNITED STATES PATENT OFFICE.

SAMUEL J. DUNKLEY, OF OAKLAND, CALIFORNIA, ASSIGNOR TO DUNKLEY COMPANY, OF KALAMAZOO, MICHIGAN.

MEANS FOR REGULATING AND CONTROLLING THE STRENGTH OF LYE SOLUTION.

Application filed August 8, 1921. Serial No. 490,754.

*To all whom it may concern:*

Be it known that I, SAMUEL J. DUNKLEY, a citizen of the United States, residing at Oakland, county of Alameda and State of California, have invented certain new and useful Improvements in Means for Regulating and Controlling the Strength of Lye Solution, of which the following is a specification.

This invention relates to a means for regulating and controlling the strength of lye solution in a lye peach peeling apparatus, although the invention is adapted to a variety of purposes.

The object of the invention is to provide complete automatic control of the strength of the lye or other disintegrating solution in a peach peeling apparatus.

Objects of the invention pertaining to details and economies in construction and operation will definitely appear from the detailed description to follow.

I accomplish the objects of my invention by the apparatus and means described in the following specification. The invention is clearly defined and pointed out in the claims.

A structure which is a preferred embodiment of my invention is fully illustrated in the accompanying drawings forming a part of this specification, in which:

Fig. I is a diagrammatic detail side elevation view of my improved apparatus as applied to the lying section of a peach peeling machine.

Fig. II is a detail sectional elevation view taken on a line corresponding to line 2—2 of Fig. I looking in the direction of the arrows.

Fig. III is an enlarged detail perspective view of the hydrometer and electrically controlled regulating valve.

Fig. IV is a diagram of the electric wiring.

In the drawing, similar numerals of reference refer to similar parts throughout the several views.

Considering the numbered parts of the drawings by their reference numbers, 1 is the lying section of my improved peach peeling machine similar to that illustrated in my patent application dated January 8, 1921, Serial No. 435,978. 2 is the main tank which also is the means for collecting and recovering the used lye from the lying section of the peach peeler. The lye is first strained and cleared of the disintegrated peel and other débris by the screen means 12.

3 is the heater and pressure tank supplied with suitable steam heating coils. Lye is taken from the main tank by the centrifugal pump 4 through the suction pipe 5 and discharged into the tank 3 through the pipe 6. The tank 2 is also supplied with water to keep up the volume. The same may be controlled by suitable overflow.

The heated lye passes from the pressure tank 3 through the pipe 7 up by the side of the lying section of my improved peach peeler and when the machine is in operation delivers to the spray nozzles through the valves 8—8. (See Fig. I.) The pipe 7 in reduced section is continued at 7' for the purpose of delivering through the regulating valve 13 to the lye mixing tank 9. The lye mixing tank 9 is like that appearing in my Patent #1, 374,291, the details of which structure I do not here illustrate as they are no part of my present invention.

Pipe 10 leads from the regulating valve 13 to the tank 9 and is provided for delivering the weakened lye solution or water into the said tank 9 so that it will dissolve and take up the caustic soda which is there supplied. When the lye from this tank is strengthened it is discharged by gravity through the pipe 11 into the main tank 2 and increases the strength of the solution therein, bringing it up to any predetermined strength. A cock 11' is provided in pipe 11.

Pipe 14 (see Fig. II) branches from pipe 6 and leads to the hydrometer tank 15. The hydrometer 16 is disposed within this tank and the upper end of its float is connected to lever 17 by a ball-and-socket joint 17'. The lever 17 is pivoted at 18 and is provided with a switch means comprising an insulated electrical connection and terminal 21 which is adapted alternately to connect with the terminals of the circuits 22 and 23. These act through the solenoid 25 to control the regulating valve 13.

When the solution in the hydrometer tank 15 is strengthened it raises the float 16 and with it the end of the lever 17, thus connecting to the circuit 22 and acting upon the solenoid to close the control valve 13. When the float drops the upper connection to circuit 23 is made and the valve opened. The control valve in detail is described in connection with its solenoid in my patent application concurrent herewith and the details are not here dwelt upon. The usual switch 24 with fuses 24' is provided for manual control and the protection of the same.

The hydrometer tank 15 is provided with an overflow 26 which passes into the pipe 27 and thence back to the main tank 2. The drain 13' from the regulating valve 13 also connects into this pipe 27. Suitable stop cocks are provided in all of the pipes for effectively shutting them off which it is not deemed necessary to refer to or enumerate in detail.

I will now indicate the operation of my improved regulating means:—

In the beginning, water is put in the tank 2 and a drum of caustic soda is put in the mixing tank 9. The pump 4 is put in operation delivering water through the pipe 6 to the heating tank 3, thence up through pipe 7, on through the reduced portion 7' through the regulating valve 13 into the mixing tank 9, whence the solution passes down through the pipe 11 back to tank 2. This circulation continues with the operation of the pump and the solution is delivered through the pipe 14 branching from the pipe 6 to the hydrometer tank 15, thence overflowing therefrom through pipe 26 down through the pipe 27 back to the tank 2. As the water continues to circulate it takes up more and more of the lye until the same becomes sufficiently dense to raise the hydrometer float 16, closing the circuit 22 and reacting upon the electric means and shutting off the regulating valve 13. The lye has then become of sufficient or the desired strength to use in the peach peeling machine. The pump 4 continues its operation keeping up the pressure and delivering the lye through the valves 8—8 into the lye section of the peach peeler. The lye, with the peel and the débris, passes down through the strainer 12 and thence into the supply tank 2. The lye is thus consumed and the solution is weakened. Fresh water is added to the tank 2 to maintain the supply. The solution weakens, and as there is a constant flow of the same from the pipe 6 to the delivery side of the pump 4 into the hydrometer through branch 14, the float 16 soon falls carrying down with it through the ball and socket connection 17' the outer end of the lever 17, closing the circuit 23 and opening the valve. Then a quantity of the weakened lye passes through reduced pipe 7' to the mixing chamber 9 taking up more lye and passing on to and strengthening the solution in the tank 2. The pump is ample to keep up the pressure in the peeling machine as well and the strengthening of the lye is continuous during the operation of the machine and the strength of the lye is maintained at any pre-determined point.

The hydrometer is set at zero by adjusting the weight 28 and the weight 29 is set at the proper notch to secure the required strength.

While I have shown a particular form of electrically controlled valve, I desire to state that my improved apparatus is effective with any sort of electrically controlled valve. I here wish to claim such electrical control broadly and have made the particular electric device here illustrated the subject matter of an independent patent application.

I desire to state also that any hydrometer connected to a switch can be used in this connection, and I do not wish to be understood as limiting my claims to a particular design. I have made the particular design of hydrometer the subject matter of an independent patent application. I wish to claim the invention broadly and specifically as pointed out in the appended claims.

Having thus described my invention, what I claim as new and desire to secure by Letters Patent, is:—

1. In a lying apparatus, the combination of a main tank, circulating means therefrom to supply lye or disintegrating solution for use, a recovery means for collecting the used lye and returning the same to the main tank, a lye mixing tank to add strength to the solution, connections delivering from the main tank to the mixing tank, a regulating valve therefor, electric means for controlling the said regulating valve, a hydrometer, a branch circuit from the circulating system to the hydrometer, and connections from the hydrometer to the electric means to control the same, for the purpose specified.

2. In an apparatus of the class described, the combination of the main tank, a mixing tank, means for delivering from the main tank to the mixing tank and return, a regulating valve to control the delivery from the main tank to the mixing tank, electric means for controlling the said valve, a hydrometer acted upon by the solution of the main tank connected to control the said electric means, as specified.

3. In an apparatus of the class described, the combination of a main tank, a mixing tank, a pump drawing from the main tank and delivering to the mixing tank and an operating system, a regulating valve, a hydrometer, means for conducting solution from the said pump to the hydrometer, electric means for controlling the said valve and connections from the hydrometer to control the electric means, as specified.

4. In an apparatus of the class described, the combination of a main supply of solution with means for circulating the same, a mixing tank for strengthening the said solution with pipe connection to the main supply, a regulating valve to control the delivery to the mixing tank, a hydrometer acted upon by the solution of the main supply, and connections from the said hydrometer to control the regulating valve, as specified.

In witness whereof, I have hereunto set my hand and seal in the presence of two witnesses.

SAMUEL J. DUNKLEY.

Witnesses:
E. R. OWENS,
BLANCHE B. CHAMBERLAIN.